US 7,036,317 B2

(12) United States Patent
Tanaka et al.

(10) Patent No.: US 7,036,317 B2
(45) Date of Patent: May 2, 2006

(54) DUAL FUEL TYPE COMBINED TURBINE PLANT AND METHOD FOR OPERATING THE SAME

(75) Inventors: Satoshi Tanaka, Hyogo-ken (JP); Koji Tanaka, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 225 days.

(21) Appl. No.: 10/704,983

(22) Filed: Nov. 12, 2003

(65) Prior Publication Data

US 2004/0112038 A1 Jun. 17, 2004

(30) Foreign Application Priority Data

Nov. 13, 2002 (JP) .............................. 2002/329078

(51) Int. Cl.
*F02C 6/18* (2006.01)
*F02C 7/00* (2006.01)
(52) U.S. Cl. .................. 60/773; 60/39.182; 60/803
(58) Field of Classification Search ............. 60/39.182, 60/772, 773, 803
See application file for complete search history.

(56) References Cited

U.S. PATENT DOCUMENTS

| 3,879,616 | A | * | 4/1975 | Baker et al. ............. 60/39.182 |
| 4,550,565 | A | * | 11/1985 | Ozono ..................... 60/39.182 |
| 6,578,352 | B1 | * | 6/2003 | Morikawa et al. ....... 60/39.182 |
| 6,651,440 | B1 | * | 11/2003 | Tanaka et al. ................ 60/772 |

FOREIGN PATENT DOCUMENTS

JP          9-32508         2/1997

* cited by examiner

*Primary Examiner*—Louis J. Casaregola
(74) *Attorney, Agent, or Firm*—Wenderoth, Lind & Ponack, L.L.P.

(57) ABSTRACT

A turbine plant includes a steam turbine, a gas turbine connected to the steam turbine, a generator, and an analyzing apparatus. The steam turbine includes a high pressure steam turbine, an intermediate pressure steam turbine, and a low pressure steam turbine. The turbine plant is adapted to be driven by a selected one of natural gas and oil. The analyzing apparatus collects estimates of the steam turbine output based on the inlet steam pressure of the intermediate steam turbine with a correction value. The correction value is calculated including the influence of the difference between the gas fuel case and the oil fuel case. The analyzing apparatus estimates a gas turbine output by calculating the difference between the estimated steam turbine output and the total output of the turbine plant. The gas turbine is operated using the estimated gas turbine output.

19 Claims, 7 Drawing Sheets

US 7,036,317 B2

DUAL FUEL TYPE COMBINED TURBINE PLANT AND METHOD FOR OPERATING THE SAME

BACKGROUND OF THE INVENTION

1. Field of the Invention

The present invention relates to an apparatus for and a method of estimating a steam turbine output in a single shaft combined plant of a dual fuel type, an apparatus for estimating a gas turbine output, and an apparatus for controlling a single shaft combined plant of a dual fuel type.

2. Description of the Related Art

A control method for controlling a single shaft combined plant according to related art is explained with reference to FIG. 1. As shown in FIG. 1, a single shaft combined plant is a plant in which a gas turbine 201 and a steam turbine 202 are connected by a single shaft.

In the single shaft combined plant, the pilot ratio (a ratio between a main fuel flow rate and a pilot fuel flow rate) is controlled on the basis of the difference between a measured shaft output (on the MW basis) 211 of a generator G and a target generator output 211a. That is, for controlling the pilot ratio, it is enough to know the shaft output 211 of the generator G, which is the total of the output of the steam turbine 202 and the output of the gas turbine 201 (a gas turbine output 213). It is not necessary to know the output of the steam turbine 202 and the gas turbine output 213 separately.

On the contrary, an amount of air provided into a compressor C' and an amount of air provided into a burner 314 are controlled on the basis of the gas turbine output 213 (on the MW basis). However, the gas turbine output 213 can not be directly measured. So, an operating unit 210 calculates an estimated output 212 (MW conversion) of the steam turbine, which is estimated to be outputted from the steam turbine 202. Then, a subtractor calculates the gas turbine output 213 by subtracting the estimated output 212 of the steam turbine from the measured shaft output (on the MW basis) of the generator G'.

A combustor bypass valve opening instruction 216 and an IGV opening instruction 217 are calculated so that a stable combustion situation can be obtained in a gas turbine combustor 214 on the basis of the calculated gas turbine output 213. A combustor bypass valve 220 and an IGV 221 are driven to thereby control the amounts of air introduced into the compressor C' and the combustor 214. That is, a first function generator 204 receives a signal indicating the gas turbine output 213 and outputs a signal 216 indicative of an optimal combustor bypass valve opening. A second function generator 205 receives a signal indicating the gas turbine output 213 and outputs a signal 217 indicating an optimal IGV opening.

In a conventional single fuel type (a natural gas combustion type) single shaft combined plant using a premix burner in the gas turbine combustor 214 as shown in FIG. 2, the steam turbine output 212 is estimated on the basis of an intermediate turbine inlet steam pressure 231 by multiplying the correction values of steam temperatures 232, 233 and a steam condenser vacuum degree (steam turbine exhaust pressure) 234, in order to make efficiency high and reduce an exhaust amount of harmful substances (NOx and the like).

Hereafter, the steam turbine output 212 estimated by the method in FIG. 2 is referred to as a steam turbine output 230.

The calculating section 210 in FIG. 1 calculating the steam turbine output 212 corresponds to the part indicated by a symbol A' in FIG. 2. That is, in the conventional art, the steam turbine output 230 shown in FIG. 2 is inputted to the subtractor 203 as the steam turbine output 212.

Here, the reason why the steam turbine output 230 can be calculated on the basis of only the intermediate pressure turbine inlet steam pressure 231 as shown in FIG. 2 is explained with reference to FIG. 3.

The flows of water and steam in the single fuel type (natural gas combustion type) combined plant is shown in FIG. 3. The flows of the water and the steam shown in FIG. 3 are basically equal to those in the single shaft combined plant and a multi-shaft combined plant.

The steam turbine output 230 is calculated by multiplying an efficiency of the steam turbine 202 by a thermal energy of the steam flowing into the steam turbine 202. The thermal energy of the steam is calculated by multiplying the steam flow rate by the steam enthalpy. Thus, the total thermal energy of the steam flowing into the steam turbine 202 is represented by the following formula:

(Flow Rate of High Pressure Steam 251)×(Enthalpy of High Pressure Steam 251)+(Flow Rate of Intermediate pressure Steam 258)×(Enthalpy of Intermediate pressure Steam 258)+(FlowRate of Low Pressure Steam 251)×(Enthalpy of Low Pressure Steam 261)

The flow rate of intermediate pressure steam 258 is represented by a function of a difference between the intermediate pressure turbine inlet steam pressure 231 and the steam condenser vacuum degree 234. Also, the enthalpy of intermediate pressure steam 258 is represented by a function of the intermediate pressure turbine inlet steam pressure 231 with correction of the intermediate pressure steam temperature 233 as a multiplier.

In the combined plant, as shown in FIG. 3, the high pressure steam 251 generated in a high pressure drum 250, after carrying out a work in a high pressure steam turbine 252, passes through a low temperature reheating steam tube 253, and joins steam 256 generated in an intermediate pressure drum 255 prior to a reheating unit 254, and then flows into an intermediate pressure steam turbine 257 as an intermediate pressure steam 258. That is, there is a relation represented by the following formula:

(Flow Rate of High Pressure Steam 251)=(Flow Rate of Intermediate pressure Steam 258)−(Amount of Steam 256 Generated in Intermediate pressure Drum 255).

Also, an amount of the steam 256 generated in the intermediate pressure drum 255 is represented by a function of a pressure of the intermediate pressure drum 255, and the pressure of the intermediate pressure drum 255 is represented by the addition of a piping pressure loss and the inlet steam pressure 231 of the intermediate pressure steam turbine 257. Thus, a flow rate of the high pressure steam 251 is represented by a function of the inlet steam pressure 231 of the intermediate pressure steam turbine 257

Also, the low pressure steam 261 is mixed with the intermediate pressure steam 258 after carrying out the work inside the steam turbine 202. Thus, the inlet steam pressure of the low pressure steam turbine 262, which serves as the function of the flow rate of the low pressure steam 261, becomes the function of the inlet steam pressure 231 of the intermediate pressure steam turbine 257.

In this way, by considering heat balance, the inlet steam pressure 231 of the intermediate pressure steam turbine 257 is related to all factors. Thus, by calculating the steam turbine output 230 as a function of the inlet steam turbine pressure 231 of the intermediate pressure steam turbine 257, the steam turbine output 230 is approximately calculated.

A combined turbine plant including a gas turbine and an exhaust gas boiler generating steam by utilizing the exhaust heat from the gas turbine and a steam turbine driven by the steam from the exhaust gas boiler and connected with the gas turbine by a single shaft is disclosed, for example, in Japanese Laid Open Patent Application (JP-A-Heisei 9-32508).

SUMMARY OF THE INVENTION

Recently, in a single shaft combined plant using a premix burner in the gas turbine combustor, a single shaft combined plant of a dual fuel type is required which can be driven by both of natural gas and oil (light oil and the like) as fuel, in such a way that its operation can be carried out even if the usually used natural gas is not supplied (e.g. due to trouble with a gas company and the like).

In the single shaft combined plant of dual fuel type, it is desired that an output of a steam turbine can be calculated.

In the single shaft combined plant of dual fuel type, it is desired that an output of a gas turbine can be calculated.

In the single shaft combined plant of dual fuel type, it is desired that a proper fuel-air ratio can be achieved by controlling an air flow rate on the basis of the calculated output of the gas turbine.

In the single shaft combined plant of dual fuel type, it is desired to control the flow rates of air to be introduced into a compressor and a burner, on the basis of the calculated output of the gas turbine, so as to achieve the proper fuel-air ratio.

In the single shaft combined plant of dual fuel type, it is desired to control the flow rate of the air to be introduced into the compressor and the flow rate of the air to be passed through a combustor bypass valve, on the basis of the calculated output of the gas turbine, so as to achieve the proper fuel-air ratio.

Those calculations of the outputs of the steam turbine and the gas turbine are desired to be done by using an easy method.

Those calculations of the outputs of the steam turbine and the gas turbine are desired to be done by using a method that is not largely changed from the conventional calculation.

Therefore, an object of the present invention is to provide an apparatus for estimating the output of a steam turbine in a single shaft combined plant of dual fuel type.

Another object of the present invention is to provide an apparatus for estimating the output of a steam turbine in a single shaft combined plant of dual fuel type which can also estimate the output of a gas turbine.

Still another object of the present invention is to provide a control apparatus of a single shaft combined plant of dual fuel type in which a proper fuel-air ratio is achieved by controlling an air flow rate, on the basis of the calculated output of a gas turbine.

Still another object of the present invention is to provide a control apparatus of a single shaft combined plant of dual fuel type for controlling flow rates of air to be introduced into the compressor and the combustor of the gas turbine on the basis of a calculated output of the gas turbine so as to achieve a proper fuel-air ratio.

Still another object of the present invention is to provide a control apparatus of a single shaft combined plant of dual fuel type for controlling flow rates of air to be introduced into a compressor and a flow rate of air to be passed through a combustor bypass valve on the basis of the calculated output of the gas turbine so as to achieve a proper fuel-air ratio.

Still another object of the present invention is to provide an apparatus for estimating the output of a steam turbine in a single shaft combined plant of dual fuel type that can easily carry out the calculation of the steam turbine.

Still another object of the present invention is to provide an apparatus for estimating an output of a gas turbine in a single shaft combined plant of dual fuel type that can easily carry out the calculation of the output of the gas turbine.

Still another object of the present invention is to provide an apparatus for estimating an output of a steam turbine in a single shaft combined plant of a dual fuel type in which the calculation of the output of a steam turbine can be done by using a method that is not largely changed from a conventional method.

Still another object of the present invention is to provide an apparatus for calculating the output of the gas turbine in a single shaft combined plant of dual fuel type in which the calculation of the output of a gas turbine can be done by using a method that is not largely changed from a conventional method.

In an aspect of the present invention, a turbine plant adapted to be driven on a selected one of gas fuel and oil fuel includes a steam turbine which includes a high pressure steam turbine, an intermediate pressure steam turbine, and a low pressure steam turbine, a gas turbine connected to the steam turbine by a single rotation shaft, a generator connected to the steam turbine and the gas turbine by the rotation shaft, and an analyzing unit. The analyzing unit includes a pressure measuring unit which measures a steam pressure of an inlet side of the intermediate pressure steam turbine, a correction estimating unit which estimates a correction value associated with output of the low pressure steam turbine, and an estimating unit which estimates output of the steam turbine based on the steam pressure and the correction value.

Here, the correction value is calculated based on a flow rate of steam flowing into the low pressure steam turbine.

It is preferable that the turbine plant further includes a detecting unit which detects an opening of a regulating valve which regulates a flow rate of steam flowing into the low pressure steam turbine, an inlet pressure measuring unit which measures an inlet steam pressure of the regulating valve, and an outlet pressure measuring unit which measures an outlet steam pressure of the regulating valve. The correction value is calculated based on the opening and the inlet steam pressure and the outlet steam pressure.

Also, it is preferable that the turbine plant further includes a first correction unit calculating a first correction value based on a steam temperature of an inlet side of the high pressure steam turbine, a second correction unit calculating a second correction value based on a steam temperature of an inlet side of the intermediate pressure steam turbine, and a third correction unit calculating a third correction value based on a degree of vacuum in a steam condenser which receives steam from the steam turbine. The estimating unit estimates output of the steam turbine based on the first correction value and the second correction value and the third correction value.

Also, it is preferable that the turbine plant further includes a gas turbine output estimating unit calculating gas turbine output by subtracting output of the steam turbine from total output of the turbine plant.

Also, it is preferable that a flow rate of low pressure steam flowing into the low pressure steam turbine on condition that the gas fuel is supplied to the turbine plant is different from a flow rate of the low pressure steam on condition that the oil fuel is supplied to the turbine plant.

Also, it is preferable that the turbine plant further includes a preheating unit which preheats the gas fuel, an oil fuel bypass through which the oil fuel bypasses the preheating unit, a deaerator which receives the gas fuel from the preheating unit and the oil fuel from the oil fuel bypass, and heating steam supply piping which supplies steam for heating from a low pressure piping to the low pressure steam turbine inlet to the deaerator when the deaerator receives the oil fuel.

Also, it is preferable that the gas turbine includes a premix combustor.

Also, it is preferable that the turbine plant further includes a gas turbine output estimating unit which calculates gas turbine output by subtracting output of the steam turbine from total output of the turbine plant, and a gas turbine air controlling unit controlling a flow rate of air introduced to the gas turbine based on the gas turbine output.

Also, it is preferable that the turbine plant further includes a compressor air controlling unit controlling a flow rate of air introduced to a compressor included in the gas turbine based on the gas turbine output.

Also, it is preferable that the turbine plant further includes a combustor air controlling unit controlling a flow rate of air introduced to a combustor of the gas turbine based on the gas turbine output.

Also, it is preferable that the turbine plant further includes a bypass valve for controlling a flow rate of air exhausted from a compressor included in the gas turbine and flowing into a combustor included in the gas turbine.

In another aspect of the present invention, a turbine plant analyzing apparatus for analyzing a turbine plant adapted to be driven by a selected one of gas fuel and oil fuel is provided. The turbine plant includes a steam turbine which includes a high-pressure steam turbine, an intermediate pressure steam turbine, and a low pressure steam turbine, a gas turbine connected to the steam turbine by a single rotation shaft, and a generator connected to the steam turbine and the gas turbine by the rotation shaft. The turbine plant analyzing apparatus includes a pressure measuring unit which measures a steam pressure of an inlet side of the intermediate pressure steam turbine, a correction estimating unit which estimates a correction value associated with output of the low pressure steam turbine, and an estimating unit which estimates output of the steam turbine based on the steam pressure and the correction value.

It is preferable that the correction value is calculated based on a flow rate of steam flowing into the low pressure steam turbine.

Also, it is preferable that the turbine plant analyzing apparatus further includes a detecting unit which detects an opening of a regulating valve which regulates a flow rate of steam flowing into the low pressure steam turbine, an inlet pressure measuring unit which measures a inlet steam pressure of the regulating valve, and an outlet pressure measuring unit which measures an outlet steam pressure of the regulating valve. The correction value is calculated based on the opening and the inlet steam pressure and the outlet steam pressure.

Also, it is preferable that the turbine plant analyzing apparatus further includes a first correction unit calculating a first correction value based on a steam temperature of an inlet side of the high pressure steam turbine, a second correction unit calculating a second correction value based on a steam temperature of an inlet side of the intermediate pressure steam turbine, and a third correction unit calculating a third correction value based on a degree of vacuum in a steam condenser which receives steam from the steam turbine. The estimating unit estimates output of the steam turbine based on the first correction value and the second correction value and the third correction value.

Also, it is preferable that the turbine plant analyzing apparatus further includes a gas turbine output estimating unit calculating gas turbine output by subtracting output of the steam turbine from total output of the turbine plant.

In another aspect of the present invention, an operation method of a turbine plant adapted to be driven by a selected one of gas fuel and oil fuel is provided. The turbine plant includes a steam turbine, a gas turbine connected to the steam turbine by a single rotation shaft, and a generator connected to the steam turbine and the gas turbine by the rotation shaft. The steam turbine includes a high-pressure steam turbine, an intermediate pressure steam turbine, and a low pressure steam turbine. The analyzing method includes the steps of calculating gross output of the steam turbine by using an inlet steam pressure of the intermediate pressure steam turbine, calculating a correction value associated with output of the low pressure steam turbine, calculating net output of the steam turbine by adding the gross output and the correction value, and controlling the gas turbine based on a difference between the net output and total output of the turbine plant.

DESCRIPTION OF THE PREFERRED EMBODIMENTS

An embodiment of a single shaft combined plant of dual fuel type in the present invention will be described below with reference to the attached drawings.

At first, this embodiment is explained with reference to FIGS. 4 to 7.

This embodiment relates to a method of controlling a single shaft combined plant of dual fuel type, which has a premix burner in a gas turbine combustor 14 and can be driven by a selected one of natural gas and oil (light oil and the like) as fuel.

Figure 3:
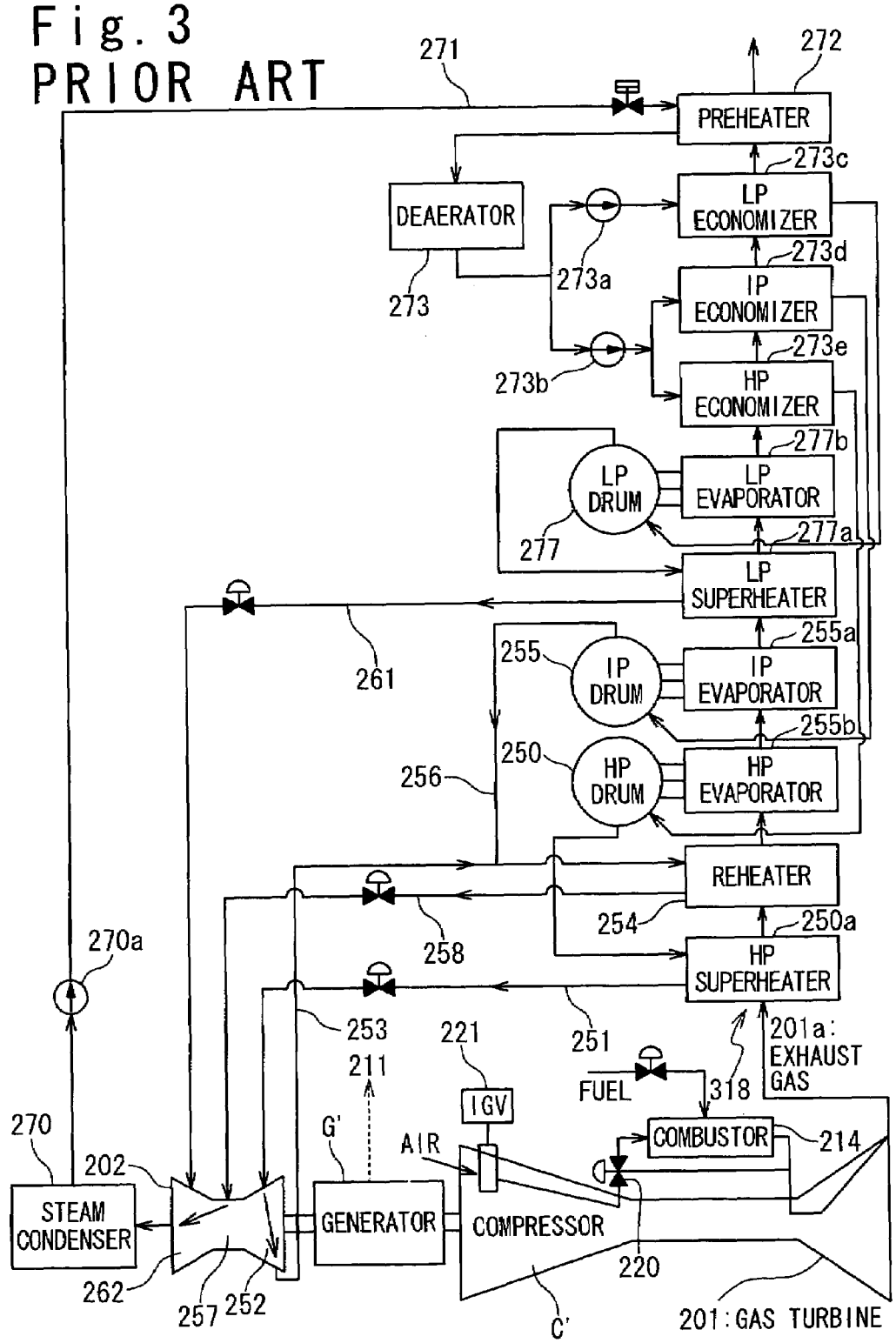
FIG. 3 shows flows of water and steam in a conventional natural gas combustion type single shaft combined plant.
Figure 5:
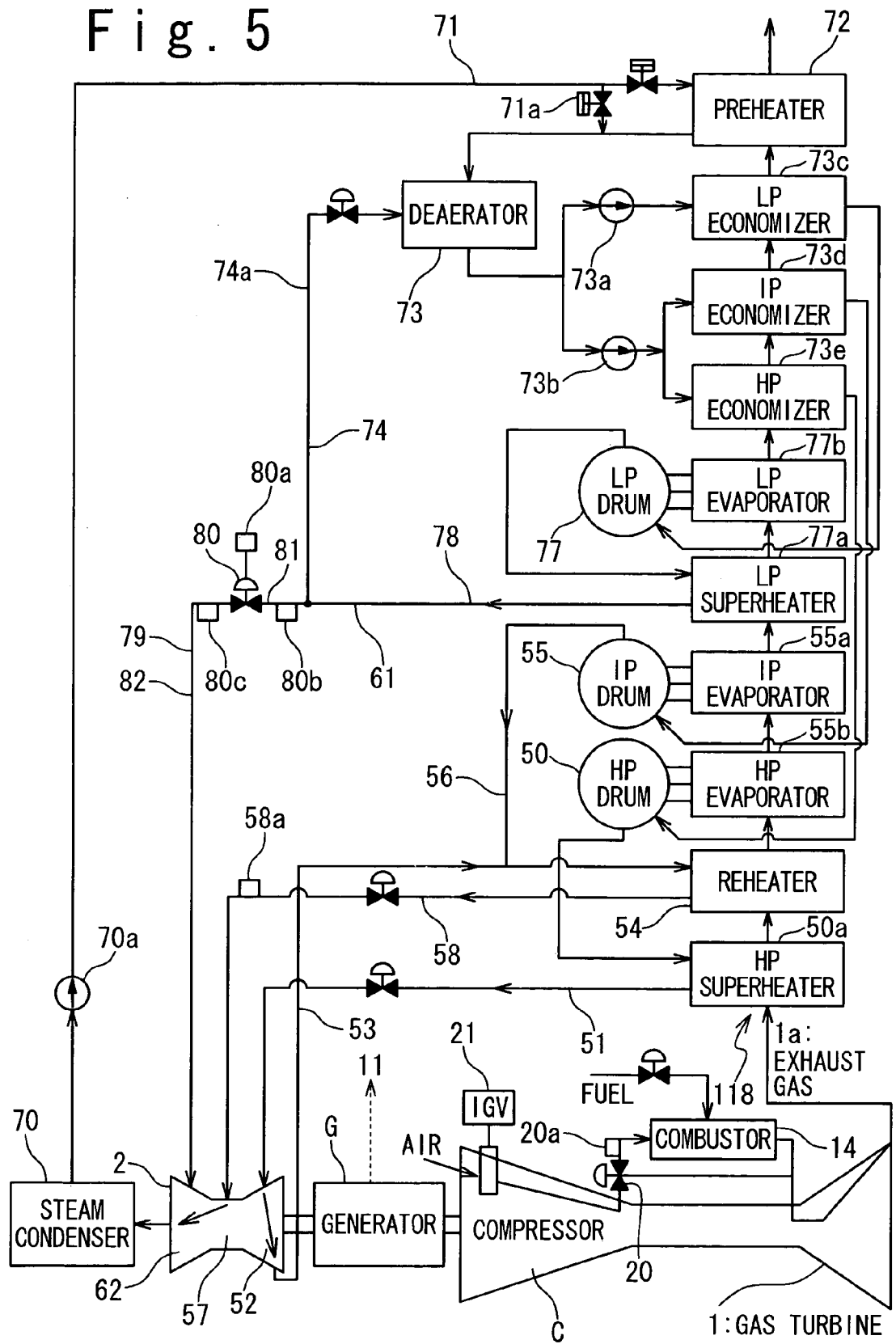
FIG. 5 shows flows of water and steam in the single shaft combined plant of dual fuel type according to an embodiment of the present invention.

FIG. 5 shows the configuration of a single shaft combined plant of the dual fuel type. In FIG. 5, in association with the adoption of the dual fuel type, a bypass valve 71a and piping 74a to branch low pressure steam 78 and supply heated steam 74 to a deaerator 73 are added to the configuration shown in FIG. 3.

Further, the turbine plant includes a combustor air controller 20a, a pressure gauge 58a, an opening sensor 80a, an inlet pressure gauge 80b, and an outlet pressure gauge 80c.

The combustor air controller 20*a* controls the flow rate of the air introduced to the combustor based on the estimated output of the gas turbine 1. The pressure gauge 58*a* measures the steam pressure of the inlet side of the intermediate pressure steam turbine 57 and sends the steam pressure to the operating unit 10, which is explained afterwards in association with the explanation of FIG. 7. The opening sensor 80*a* detects the opening of the regulating valve 80 which regulates the flow rate of the steam flowing into the low pressure steam turbine 62. The inlet pressure gauge 80*b* measures the inlet steam pressure of the regulating valve 80 and sends the inlet steam pressure to the operating unit 10. The outlet pressure gauge 80*c* measures the outlet steam pressure of the regulating valve 80 and sends the outlet steam pressure to the operating unit 10.

In the single shaft combined plant of the dual fuel type, the flows of the water and the steam are different between the gas combustion case when natural gas is used as the fuel and the oil combustion case when oil is used as the fuel, as described below. The explanation will be done by classifying it into (1) the gas combustion case and (2) the oil combustion case and with reference to FIG. 5.

In (1), the gas combustion case, water 71, after exiting from a steam condenser 70, is heated in a pre-heater 72 by exhaust gas 1*a* from the gas turbine 1. The water after exiting from the pre-heater 72, is heated, for example, up to 130° C. Although it is passed into the deaerator 73, it is not heated by the deaerator 73 (passed without any stop) and sent to water supply pumps 73*a*, 73*b*.

In (2), the oil combustion case, let us suppose that the water 71, after exiting from the steam condenser 70, is passed through the pre-heater 72. Then, a sulfur component contained in the fuel oil becomes SOx in the gas turbine 1 and is contained in the exhaust gas 1*a* from the gas turbine 1. Thus, the SOx is deposited on the pre-heater 72 and cooled by the water inside the pre-heater 72, which brings about an event in which the pre-heater 72 is corroded. To avoid such an event, in the oil combustion case, the water 71, after exiting from the steam condenser 70, is directly sent to the deaerator 73 through the bypass valve 71*a* without being passed through the pre-heater 72. In this case, the water 71 is not passed through the pre-heater 72 and not heated by the pre-heater 72. Thus, it needs to be heated by the deaerator 73. The heating operation in the deaerator 73 requires heated steam 74. This heated steam 74 is used after having branched from the low pressure steam 78 generated from the low pressure drum 77.

As described above, in (1), the gas combustion case, the steam 78 generated from the low pressure drum 77 is all sent to the steam turbine 2. In (2), the oil combustion case, most of the steam 78 generated from the low pressure drum 77 is used as heated steam 74 in the deaerator 73. Thus, little steam 79 is sent to the steam turbine 2.

In this way, the steam flow rate 79 flowing into a low pressure steam turbine 62 is different between (1) the gas combustion case and (2) the oil combustion case, even if an inlet steam pressure 31 of the intermediate pressure steam turbine 57 is the same. Thus, there is a difference between steam turbine outputs 12. Consequently, this embodiment is proposed from the above-mentioned viewpoint of the inventor.

Figure 1:
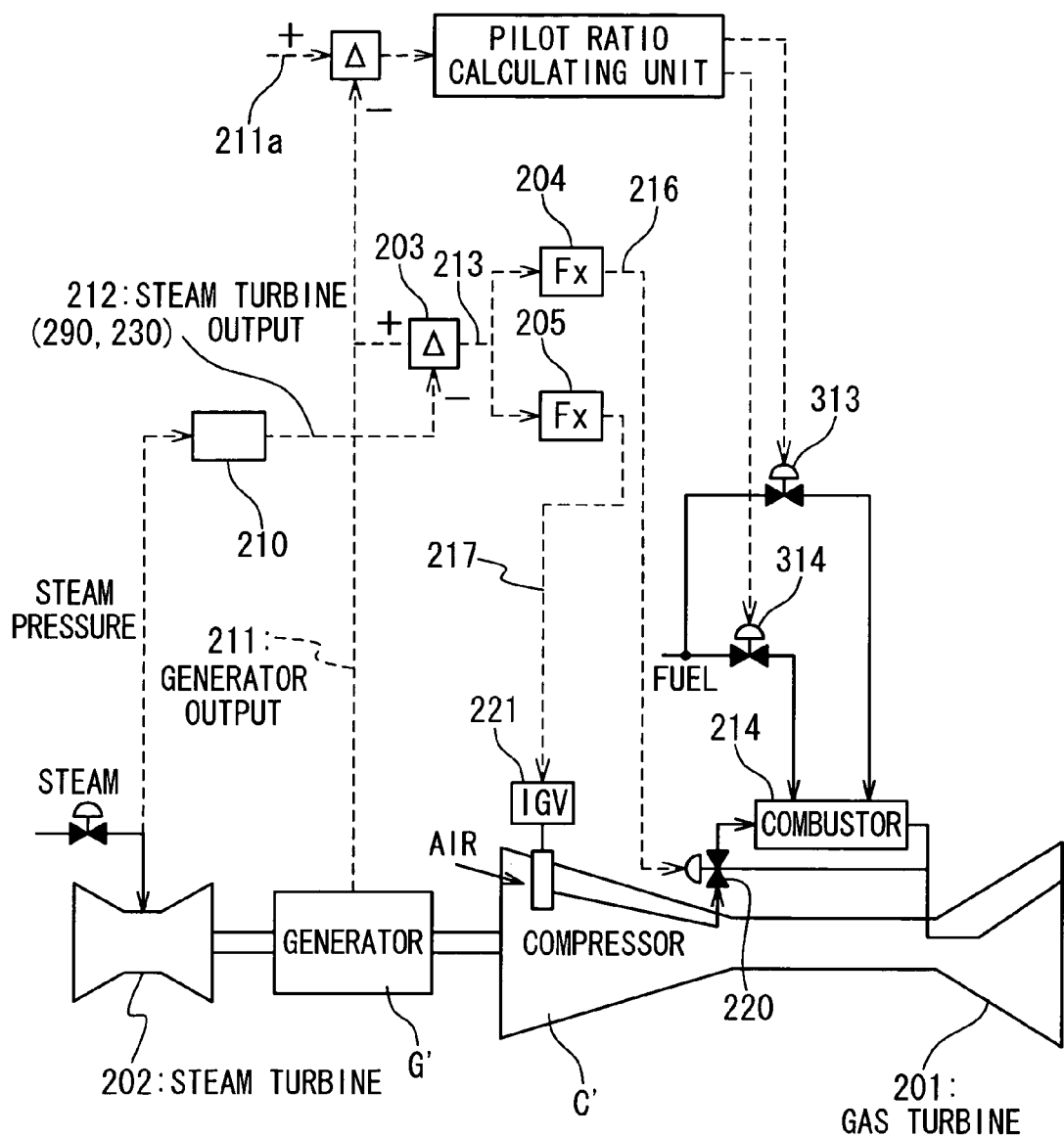
FIG. 1 shows a conventional method of controlling a single shaft combined plant.
Figure 2:
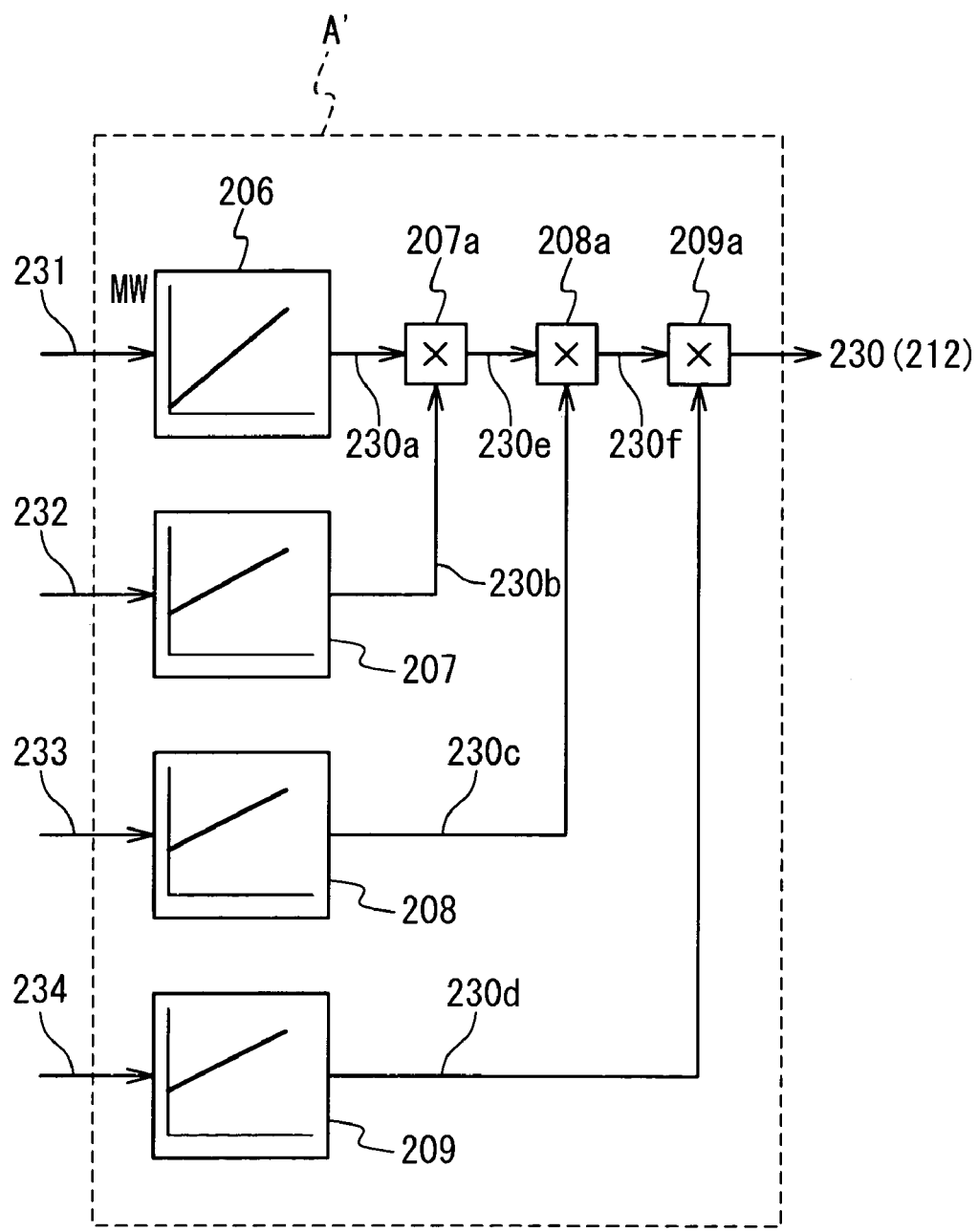
FIG. 2 shows a conventional method of calculating a steam turbine output in a conventional natural gas combustion type single shaft combined plant.

According to the above-mentioned viewpoint, in the single shaft combined plant of the dual fuel type, if the control method (the steam turbine output 30 is calculated on the basis of the inlet steam pressure 31 of the intermediate pressure steam turbine 57, as shown in FIG. 2, and a combustor bypass valve opening instruction 16 and an IGV opening instruction 17 are calculated on the basis of the steam turbine output 30) conventionally applied to the single shaft combined plant of the natural gas only combustion type is applied for controlling combustor bypass valve 20 and IGV 21, stable combustion can not be achieved, which results in a problem.

At first, the basic operation of the single shaft combined plant to which this embodiment is applied is explained.

As shown in FIG. 5, the air compressed by a compressor C is mixed with the fuel in a combustor 14 and combusted therein. The combustion air of a high temperature expands in the gas turbine 1 so that the output of the gas turbine is gained. Also, the exhaust gas 1*a* from the gas turbine is supplied into an exhaust heat recovery boiler 118. Then, steam is generated from the water supplied to the pre-heater 72 by heat exchange. The generated steam is supplied to a high pressure steam turbine 52, the intermediate pressure steam turbine 57 and the low pressure steam turbine 62. Moreover, the steam sent to the high pressure steam turbine 52 is re-heated by a re-heater 54. Then, it is supplied to the intermediate pressure steam turbine 57 to thereby obtain the output. The thus-obtained output is collected by a generator G. In the single shaft combined plant, the gas turbine 1 and the three kinds of steam turbines 52, 57 and 62 are connected on the same axis through coupling. The driving force of the compressor C is supplied from those turbines. The exhaust gas whose heat is recovered by the exhaust heat recovery boiler 118 is discharged to atmosphere. The steam whose energy is collected by the low pressure steam turbine 62 is changed into water in the steam condenser 70, and again supplied to the exhaust heat recovery boiler 118 by a condensate pump 70*a*.

The steam turbine 2 has three lines, namely, a high pressure line, an intermediate pressure line, and a low pressure line. The water, after having passed through the condensate pump 70*a* and being supplied into the pre-heater 72, is supplied into the deaerator 73 (in (1), the gas combustion case). After having passed through the deaerator 73, it is divided into a low pressure system and a high intermediate pressure system. In the low pressure system, low pressure steam 61 generated after having passed through a low pressure pump 73*a*, a low pressure economizer 73*c*, the low pressure drum 77 and a low pressure super-heater 77*a* is passed into the low pressure steam turbine 62. In the high intermediate pressure system, steam 56 generated after having passed through a high intermediate pressure pump 73*b*, an intermediate pressure economizer 73*d* and an intermediate pressure drum 55 joins steam that has passed through a low temperature re-heating steam tube 53 (high pressure steam 51 enters into the low temperature re-heating steam tube 53 after carrying out work in the high pressure steam turbine 52). Then, after being heated by the re-heater 54, it is passed as intermediate pressure steam 58 into the intermediate pressure steam turbine 57. Also, the high pressure steam 51 generated after being passed through the high middle pump 73*b*, a high pressure economizer 73*e*, the high pressure drum 50 and a high pressure super-heater 50*a* is passed into the high pressure steam turbine 52. Incidentally, a low pressure vaporizer 77*b*, a intermediate pressure vaporizer 55*a* and a high pressure vaporizer 55*b* are connected to the low pressure drum 77, the intermediate pressure drum 55 and the high pressure drum 50, respectively.

Figure 7:
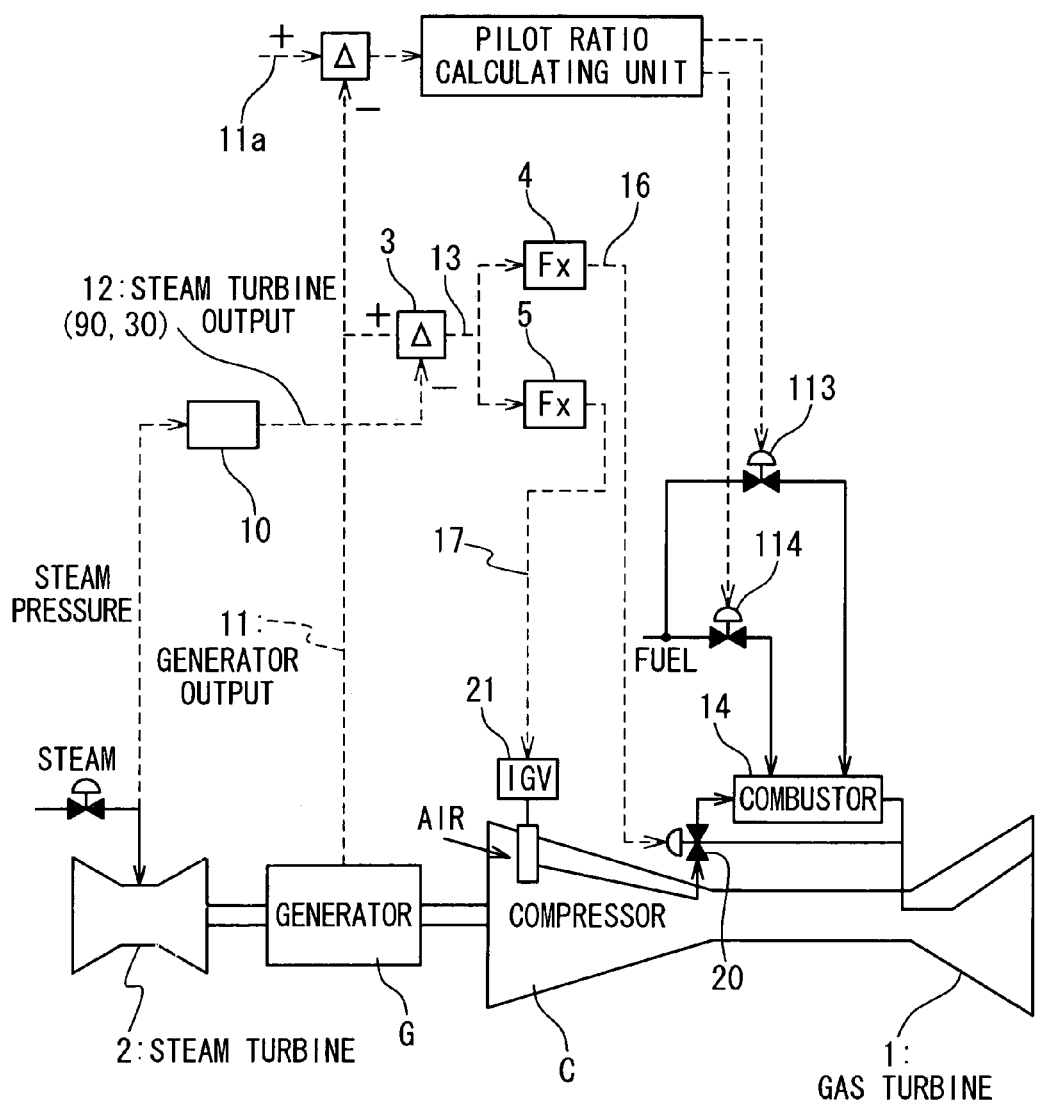
FIG. 7 shows a method of controlling a single shaft combined plant according to the present invention.

The control method for controlling a single shaft combined plant according to a related art is explained with reference to FIG. 7. As shown in FIG. 7, the single shaft combined plant is a plant in which a gas turbine 1 and a steam turbine 2 are connected by a single shaft.

In the single shaft combined plant, the pilot ratio (a ratio between a main fuel flow rate and a pilot fuel flow rate) is controlled on the basis of the difference between a measured shaft output (on the MW basis) 11 of a generator G and a target generator output 11a. That is, for controlling the pilot ratio, it is enough to know the shaft output 11 of the generator G, which is the total of the output of the steam turbine 2 and the output of the gas turbine 1 (a gas turbine output 13). It is not necessary to know the output of the steam turbine 2 and the gas turbine output 13, respectively.

On the contrary, the amount of air provided into a compressor C and amount of air provided into a combustor 14 are controlled on the basis of the gas turbine output 13 (on the MW basis). However, the gas turbine output 13 can not be directly measured. So, an operating unit 10 calculates an estimated output 12 (MW conversion) of the steam turbine 2. Then, a subtractor calculates the gas turbine output 13 by subtracting the estimated output 12 of the steam turbine from the measured shaft output (on the MW basis) of the generator G.

A combustor bypass valve opening instruction 16 and an IGV opening instruction 17 are calculated so that a stable combustion situation can be obtained in a gas turbine combustor 14 on the basis of the calculated gas turbine output 13. A combustor bypass valve 20 and an IGV 21 are driven to thereby control the amounts of air introduced into the compressor C and the combustor 14. That is, a first function generator 4 receives a signal indicating the gas turbine output 13 and outputs a signal 16 indicative of an optimal combustor bypass valve opening. A second function generator 5 receives a signal indicating the gas turbine output 13 and outputs a signal 17 indicating an optimal IGV opening.

Here, the gas turbine 1 including the gas turbine combustor 14, the combustor bypass valve 20 and the IGV 21 shown in FIG. 5 and FIG. 7 is explained with reference to FIG. 6.

Figure 6:
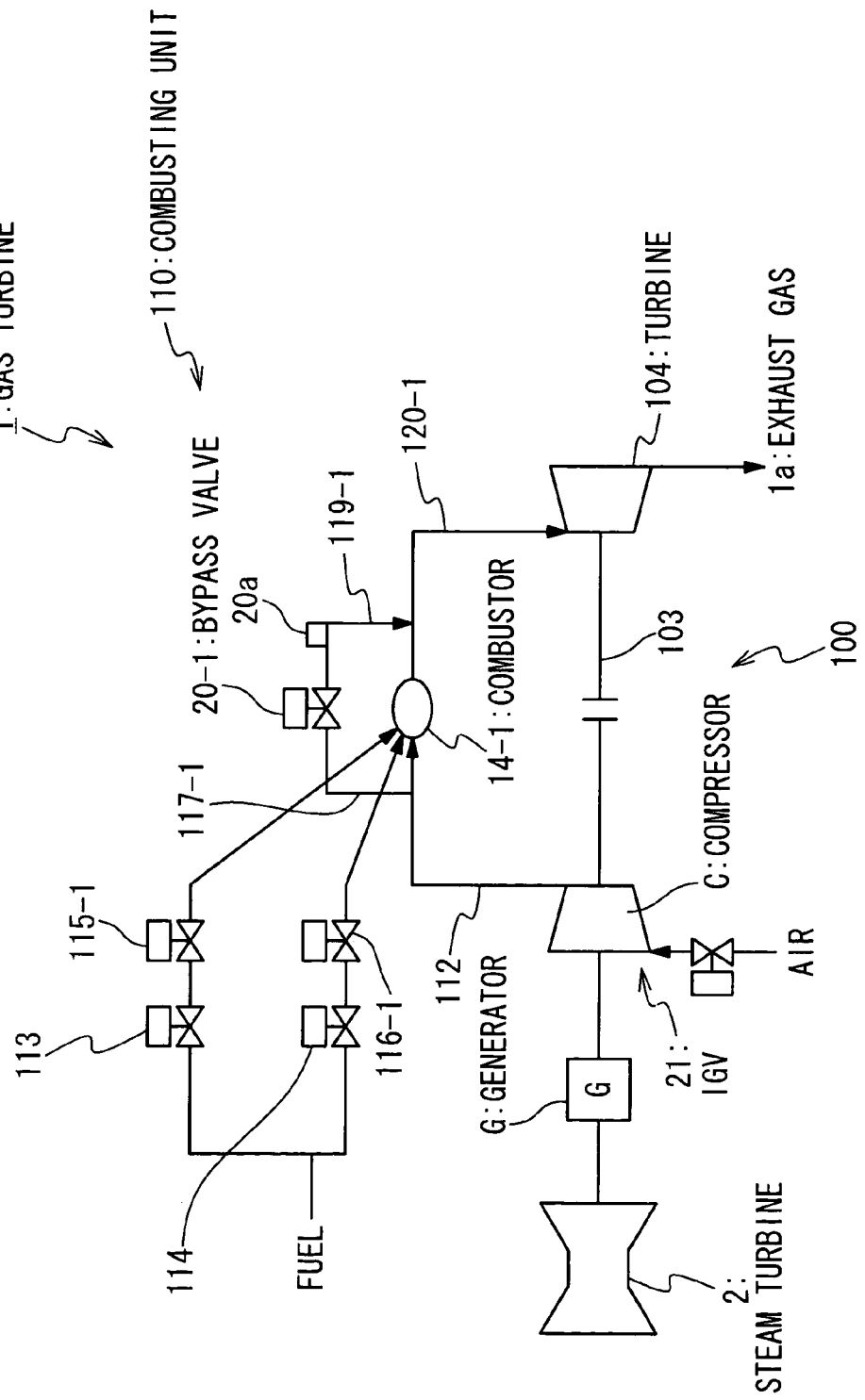
FIG. 6 is a block diagram showing a configuration of a gas turbine in a single shaft combined plant according to an embodiment of the present invention.

FIG. 6 is a schematic view showing the configuration of the gas turbine 1. The gas turbine 1 has a turbine body 100 and a combusting unit 110.

The combusting unit 110 has a plurality (m) of combustors. Here, in the case of the explanation common in all of the plurality of combustors 14-1 to 14-m, they are referred to as the combustor 14, and in the case of the explanation with regard to an individual combustor, for example, it is referred to as a combustor 14-1 (implying the first combustor). A bypass air introducing tube 117, a bypass valve 20, a bypass air mixing tube 119, a combustion gas introducing tube 120, a main fuel supplying valve 115 and a pilot fuel supplying valve 116, which are the members belonging to the combustor 14, are similarly referenced.

FIG. 6 representatively shows only the combustor 14-1 that is the first combustor in the combustors 14. The explanation will be performed on the combustor 14-1 and its related configuration.

The turbine body 100 includes the compressor C having the IGV 21, a rotation axis 103 and a turbine 104. Also, the combusting unit 110 includes a compression air introducing unit 112, a bypass air introducing tube 117-1, a bypass valve 20-1, a bypass air mixing tube 119-1, a combustion gas introducing tube 120-1, the combustor 14-1, a main fuel flow rate control valve 113, a pilot fuel flow rate control valve 114, a main fuel supplying valve 115-1 and a pilot fuel supplying valve 116-1. The generator G and the steam turbine 2 are connected to the gas turbine 1.

The air introduced from outside is compressed by the compressor C and supplied to each combustor 14. On the other hand, a part of the fuel is sent through the pilot fuel flow rate control valve 114 to the pilot fuel supplying valve 116 of each combustor 14, from which it is introduced into each combustor 14. Also, the remaining fuel is sent through the main fuel flow rate control valve 113 to the main fuel supplying valve 115 of each combustor 14, from which it is introduced into each combustor 14. The introduced air and fuel are combusted in each combustor 14. The combustion gas generated by the combustion is introduced into the turbine 104 to thereby rotate the turbine 104. Its rotational energy causes the generator G to produce an electric power.

The respective sections in FIG. 6 will be described below. At first, the turbine body 100 is explained.

The turbine 104 is connected to the piping for exhausting the combustion gas to the outside and the combustion gas introducing tube 120. The turbine 104 is coupled through the rotation axis 103 to the compressor C, the generator G and the steam turbine 2. The turbine 104 receives the supply of the combustion gas from the combustor 14 through the combustion gas introducing tube 120. The turbine 104 is rotated by converting the energy of the combustion gas into a rotational energy. This rotation rotates the generator G, the compressor C and the steam turbine 2. The combustion gas (the exhaust gas 1a) used to produce the electric power is supplied to the exhaust heat recovery boiler 118.

The compressor C is connected to the compression air introducing unit 112 and the piping for introducing the air from the outside. The compressor C is coupled through the rotation axis 103 to the turbine 104, the generator G and the steam turbine 2. The compressor C is rotated by the transmission of the rotation of the turbine 104. In the compressor C, its rotation causes the air to be introduced from the outside. Then, the compressor C compresses the introduced air and sends out to the combustor 14.

The IGV (the inlet guide vane, the inlet guide wing) 21 is the rotational wing on the air introducing side of the compressor C. The control of the open degree (angle) of the IGV 21 enables the flow rate of the air introduced into the compressor C to be adjusted even if a rotational number is constant. The open degree of the IGV 21 is controlled by the IGV opening instruction 17. The IGV 21 introduces a large quantity of air into the compressor C by opening the IGV 21, in order to maintain a proper fuel-air ratio for the large quantity of controlled fuel, in the case of a high load. It introduces a small quantity of air into the compressor C by closing the IGV 21, in order to maintain the proper fuel-air ratio for the small quantity of controlled fuel, in the case of a low load.

The rotation axis 103 is connected to the compressor C, the turbine 104, the generator G and the steam turbine 2, and it is the shaft that transmits the rotational force of the turbine 104 to the compressor C, the generator G and the steam turbine 2.

The generator G is connected through the rotation axis 103 to the turbine 104. It is the electric power producing apparatus that converts the rotational energy of the turbine 104 into the electric power energy.

The combusting unit 110 will be explained below.

The compression air introducing unit 112 is the space for introducing air in the introducing tube connected to the compressor C and a casing (chamber) of the combusting unit 110 and the like. It introduces the compressor discharge air compressed by the compressor C into the combustor 14-1.

In the bypass air introducing tube 117-1, one end thereof is opened in and connected to the compression air introducing unit 112, and the other end is connected to the bypass valve 20-1. It is a tube used to bypass a component of the compressor discharge air, which is then not supplied to the combustor 14-1, to the turbine 104.

In the bypass valve (combustor bypass valve) 20-1, one end thereof is connected to the bypass air introducing tube 117-1, and the other end is connected to the bypass air mixing tube 119-1. It is a valve to control the flow rate of the air to be passed through the bypass air introducing tube 117-1. The air flow-rate is controlled by the combustor bypass valve opening instruction 16. It supplies a large quantity of air to the combustor 14 by closing the combustor bypass valve 20 in order to maintain the proper fuel-air ratio for a large quantity of controlled fuel in the case of a high load. It supplies a small quantity of air to the combustor 14 by opening the combustor bypass valve 20 in order to maintain the proper fuel-air ratio for a small quantity of set fuel in the case of a low load.

In the bypass air mixing tube 119-1, one end thereof is connected to the bypass valve 20-1, and the other end is connected to the combustion gas introducing tube 120-1. The air passed through the bypass valve 20-1 is supplied to the combustion gas introducing tube 120-1 in order to mix with the combustion gas generated in the combustor 14-1.

In the main fuel flow rate control valve 113, one end thereof is connected to the piping for supplying the fuel from the outside, and the other end is connected to the piping connected to the plurality of main fuel supplying valves 115 (−1 to m). The main fuel flow rate control valve 113 controls the flow rate to the combustor 14 of the fuel supplied from the outside. The fuel passed through the main fuel flow rate control valve 113 is used in the main burner of the combustor 14.

In the main fuel supplying valve 115-1, one end thereof is connected to the piping linked to the main fuel flow rate control valve 113, and the other end is connected to the piping linked to the main burner of the combustor 14-1. The main fuel supplying valve 115-1 is the valve for controlling the fuel to be supplied to the main burner of the combustor 14-1.

In the pilot fuel flow rate control valve 114, one end thereof is connected to the piping for supplying the fuel from the outside, and the other end is connected to the piping linked to the plurality of pilot fuel supplying valves 116 (−1 to m). The pilot fuel flow rate control valve 114 controls the flow rate to the combustor 14 of the fuel supplied from the outside. The fuel passed through the pilot fuel flow rate control valve 114 is used in the pilot burner in the combustor 14.

In the pilot fuel supplying valve 116-1, one end thereof is connected to the piping linked to the pilot fuel flow rate control valve 114, and the other end is connected to the piping linked to the pilot burner of the combustor 14-1. The pilot fuel supplying valve 116-1 is the valve for controlling the fuel to be supplied to the pilot burner of the combustor 14-1.

The combustor 14-1 is connected to the compression air introducing unit 112 for supplying the air, the piping linked to the main fuel supplying valve 115-1 for supplying the fuel, the piping linked to the pilot fuel supplying valve 116-1 for supplying the fuel, and the combustion gas introducing tube 120-1 for sending out the combustion gas. Then, it receives the supplies of the air and the fuel, combusts them, and generates combustion gas of high temperature and high pressure. The generated combustion gas is sent out to the turbine 104.

In the combustion gas introducing tube 120-1, one end thereof is connected to the combustor 14-1, and the other end is connected to the turbine 104. Also, the bypass air mixing tube 119-1 is joined to the middle thereof. Tube 120-1 the piping for supplying the combustion gas and the bypass air to the turbine 104.

In this embodiment, in FIG. 7, the calculating method of the estimation output 12 of the steam turbine, which is inputted to a subtractor 3 when the output 13 of the gas turbine is calculated, is different from the conventional method. That is, the configuration of the operating unit 10 is different from that of the conventional method.

Figure 4:
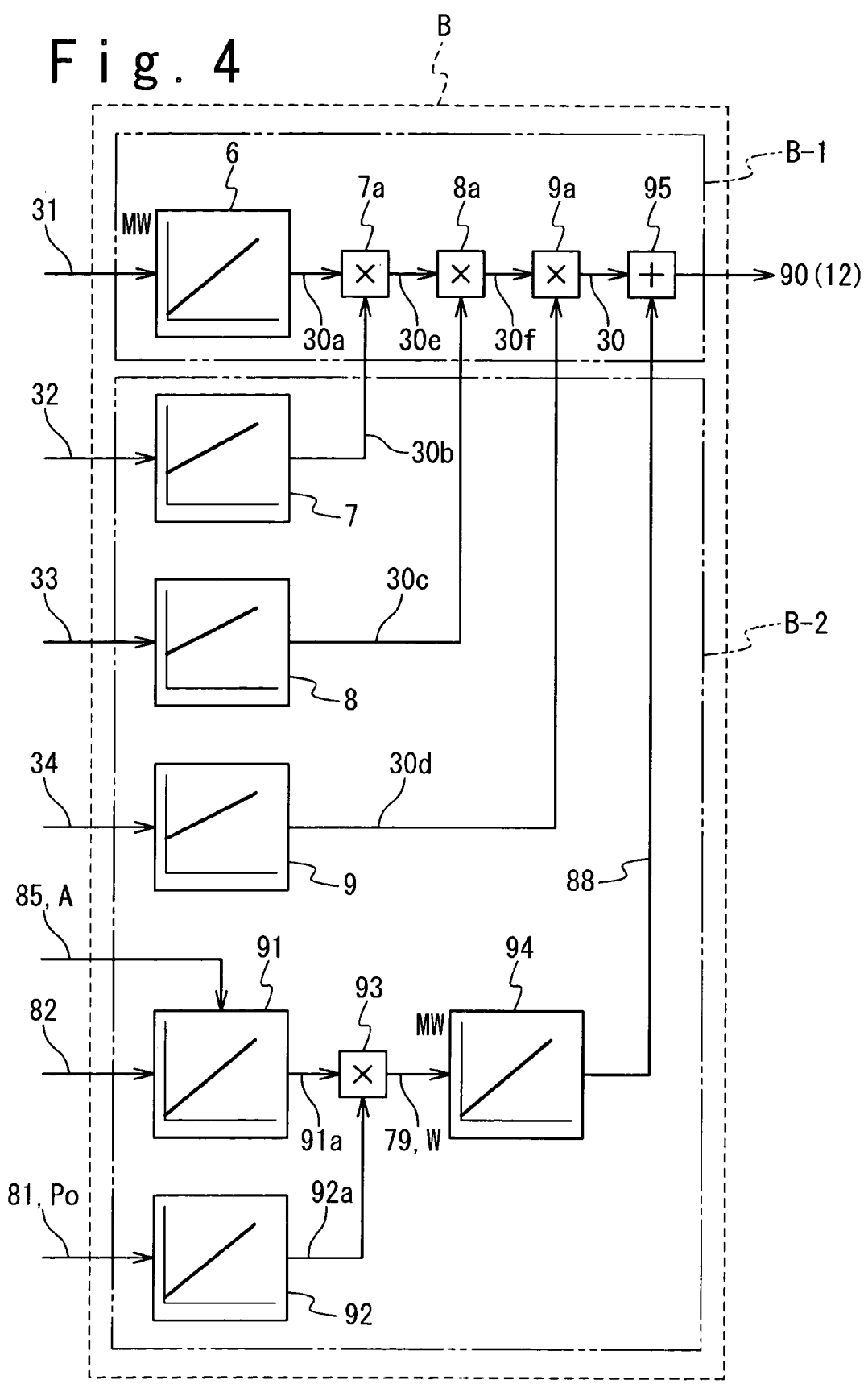
FIG. 4 shows a method of calculating a steam turbine output in a single shaft combined plant of dual fuel type according to an embodiment of the present invention.

As mentioned above, conventionally, the steam turbine output 30 has been calculated only on the basis of the inlet steam pressure 31 of the intermediate pressure steam turbine 57 as shown in FIG. 2. However, in this embodiment, a steam turbine output 90 is calculated by considering even a steam flow rate 79 flowing into the low pressure steam turbine 62. Here, the steam turbine output 12 calculated by the method of FIG. 2 is represented as the steam turbine output 30, and the steam turbine output 12 calculated by the method in FIG. 4 is represented as the steam turbine output 90.

The steam flow rate 79 flowing through a low pressure steam regulating valve 80 (refer to FIG. 5) can be represented by the following equation:

$$W = C \times P_0 \times A \times K \times \phi_{cr}$$

W: Valve Pass Flow Rate (Kg/h)

C: Valve Flow Rate Coefficient (Fixed Value)

$P_0$: Valve Inlet Pressure (Kg/cm$^2$abs)

A: Valve Stroke Area (cm$^2$)

K: Critical Flow Coefficient (1/hr) (Fixed Value)

$\phi_{cr}$: Critical Flow Rate Coefficient

The valve pass flow rate W is the steam flow rate 79 flowing into the low pressure steam regulating valve 80.

The valve inlet pressure $P_0$ is the pressure on the inlet side (refer to a symbol 81) of the low pressure steam regulating valve 80.

The valve stroke area A is the open degree of the low pressure steam regulating valve 80.

Here, the limited flow rate coefficient $\phi_{cr}$ can be calculated from a front pressure 81 of the low pressure steam regulating valve 80, namely, the valve inlet pressure $P_0$, and a rear pressure 82 of the low pressure steam regulating valve 80, namely, an inlet steam pressure 82 of the low pressure steam turbine 62.

If the inlet steam pressure 82 of the low pressure steam turbine 62, an opening degree 85 of the low pressure steam regulating valve 80, namely, the valve stroke area A, and the front steam pressure 81 of the low pressure steam regulating valve 80, namely, the valve inlet pressure $P_0$ are known, the steam flow rate 79 (W) flowing into the low pressure steam turbine 62 can be calculated on the basis of the above-mentioned equation.

If the steam flow rate 79 flowing into the low pressure steam turbine 62 is determined, a steam turbine output equivalence (a low pressure turbine output correction amount 88) resulting from the steam flowing into the low pressure steam turbine 62 can be calculated in the MW base from a work amount carried out by the steam in the low pressure steam turbine 62 and a turbine efficiency of the low pressure steam turbine 62.

The steam turbine output equivalence 88 resulting from the steam 79 flowing into the low pressure steam turbine 62 that is calculated as mentioned above is added to the steam turbine output equivalence 30 calculated on the basis of the inlet steam pressure 31 of the intermediate pressure steam turbine 57. Thus, it is possible to calculate an accurate steam turbine output equivalence 90. FIG. 4 illustrates that flow. In FIG. 4, the front pressure 81 ($P_0$) of the low pressure steam regulating valve is assumed to be controlled and compressed to an approximately constant value by the low pressure steam regulating valve 80.

A low pressure steam regulating valve opening 85 (A) and the low pressure turbine inlet steam pressure 82 are inputted to a seventh function generator 91. A signal 91a is outputted from the seventh function generator 91 as a standard value. This standard value 91a corresponds to W ($=C \times P_0 \times A \times K \times \phi_{cr}$) when the front pressure 81 ($P_0$) of the low pressure steam regulating valve is the constant value that is controlled as mentioned above.

In the seventh function generator 91, originally, the front pressure 81 ($P_0$) of the low pressure steam regulating valve required to calculate the W is not inputted under the assumption that it is a controlled constant value (an approximately fixed value). Similarly, in the seventh function generator 91, even when the $\phi_{cr}$ determined from the front pressure 81 ($P_0$) of the low pressure steam regulating valve and the rear pressure 82 of the low pressure steam regulating valve is calculated, the front pressure 81 ($P_0$) of the low pressure steam regulating valve is constant and does not influence the $\phi_{cr}$, so is not inputted. With regard to the input/output relation of the seventh function generator 91, as the open degree 85 (A) of the low pressure steam regulating valve or the low pressure turbine inlet steam pressure 82 is increased, the signal 91a tends to be gradually increased.

The front steam pressure 81 ($P_0$) of the low pressure steam regulating valve is inputted to an eighth function generator 92, and a signal 92a of a correction value is outputted from the eighth function generator 92. In the eighth function generator 92, if the front steam pressure 81 ($P_0$) of the low pressure steam regulating valve is equal to the controlled constant value, the output value 92a is 1.0. If the front steam pressure 81 ($P_0$) of the low pressure steam regulating valve exceeds the controlled constant value, the output value 92a exceeds 1.0. And, if the front steam pressure 81 ($P_0$) of the low pressure steam regulating valve is less than the controlled constant value, the output value 92a is less than 1.0. Thus, the actual value(the deviation from the controlled constant value) of the front steam pressure 81 ($P_0$) can have an influence on the control compared with the standard value 91a generated under the assumption that the front steam pressure 81 ($P_0$) of the low pressure steam regulating valve is constant so that it is not inputted to the seventh function generator 91.

A multiplier 93 multiplies the signal 91a and the signal 92a of the correction value and outputs the signal of the steam flow rate 79 (W) flowing into the low pressure turbine.

The signal of the steam flow rate 79 flowing into the low pressure turbine is inputted to a ninth function generator 94, and a low pressure turbine output correction amount 88 is outputted from the ninth function generator 94. The ninth function generator 94 outputs the steam turbine output equivalence (the low pressure turbine output correction amount 88) resulting from the steam flow rate 79 flowing into the low pressure turbine, in the MW base, from a work amount executed by the steam flow rate 79 flowing into the low pressure turbine in the low pressure turbine, and a low pressure turbine coefficient. With regard to the input/output relation of the ninth function generator 94, as the steam flow rate 79 flowing into the low pressure turbine is increased, the low pressure turbine output correction amount 88 tends to be gradually increased.

An adder 95 adds the steam turbine output equivalence 30 and the low pressure turbine output correction amount 88 and outputs the output 90 of the steam turbine.

In FIG. 7, the operating unit 10 for calculating the output 12 of the steam turbine corresponds to the section indicated by a symbol B of FIG. 4 in this embodiment. Two parts are included in B, namely, a steam turbine output estimating unit B-1 and a correction estimating unit B-2. That is, in this embodiment, the steam turbine output 90 shown in FIG. 4 is outputted as the steam turbine output 12 to the attenuator 3.

By the way, in FIG. 4, the method of calculating the steam turbine output equivalence 30 is basically corresponding to the configuration indicated by an arrow A shown in FIG. 2. That is, the signal indicative of the inlet steam pressure 31 of the intermediate pressure steam turbine 57 is inputted to a third function generator 6, and a signal 30a of a steam turbine output (MW) outputted from the third function generator 6 is the standard value. With regard to the input/output relation of the third function generator 6, as the intermediate pressure turbine inlet steam pressure 31 is increased, the signal 30a of the steam turbine output tends to be gradually increased.

A signal indicative of an inlet steam temperature 32 of the high pressure turbine 52 is inputted to a fourth function generator 7, and a signal 30b of a first correction value is outputted from the fourth function generator 7. In the fourth function generator 7, when a certain temperature is defined as a standard, if the inlet steam temperature 32 of the high pressure turbine 52 is equal to that temperature, an output value 30b is 1.0. If it is higher than that temperature, the output value 30b has a value (for example, 1.01) that exceeds 1.0 under the assumption that it has a corresponding thermal enthalpy. And, if it is lower than that value, the output value 30b has a value less than 1.0.

A signal indicative of an inlet steam temperature 33 of the intermediate pressure turbine 57 is inputted to a fifth function generator 8, and a signal 30c of a second correction value is outputted from the fifth function generator 8. In the fifth function generator 8, when a certain temperature is defined as a standard, if the inlet steam temperature 33 of the intermediate pressure turbine 57 is equal to that temperature, an output value 30c is 1.0. If it is higher than that temperature, the output value 30c has a value (for example, 1.01) that exceeds 1.0 under the assumption that it has a corresponding thermal enthalpy. And, if it is lower than that value, the output value 30c has a value less than 1.0.

A signal indicative of a vacuum degree (an exhaust pressure of the steam turbine 2) 34 of the steam condenser 70 is inputted to a sixth function generator 9, and a signal 30d of a third correction value is outputted from the sixth function generator 9. In the sixth function generator 9, when a certain pressure is defined as a standard, if the vacuum degree (the exhaust pressure of the steam turbine 2) 34 of the steam condenser 70 is equal to that pressure, an output value 30d is 1.0. If it is higher than that pressure, the output value 30d has a value (for example, 1.01) that exceeds 1.0. And if it is less than that temperature, the output value 30d has a value less than 1.0.

A multiplier 7a multiplies the signal 30a of the steam turbine output and the signal 30b of the first correction value and outputs a signal 30e of the steam turbine output.

A multiplier 8a multiplies the signal 30e of the steam turbine output and the signal 30c of the second correction value and outputs a signal 30f of the steam turbine output.

A multiplier 9a multiplies the signal 30f of the steam turbine output and the signal 30d of the third correction value and outputs the signal 30 of the steam turbine output (equivalence).

(1) In the case of the gas combustion, most of the steam 78 generated in the low pressure drum 77 flows into the steam turbine 2 (the steam flow rate 79 flowing into the low pressure turbine has the high value). Thus, the low pressure turbine output correction amount 88 is high.

(2) In the case of the oil combustion, most of the steam 78 generated in the low pressure drum 77 is used for the heated steam 74 of the deaerator 73, and only a part of the steam 78 flows into the steam turbine 2 (the steam flow rate 79 flowing into the low pressure turbine has a small value). Thus, the low pressure turbine output correction amount 88 is low.

By applying the steam turbine output equivalence 90 determined on the basis of the logic shown in FIG. 4 to the steam turbine output 12 of the control logic shown in FIG. 7, even in (1) the gas combustion case and (2) the oil combustion case, the estimation output 12 of the steam turbine can be accurately calculated, which results in an accurate determination of the output 13 of the gas turbine. Thus the combustor bypass valve opening instruction 16 and the IGV opening instruction 17 are determined from the calculation in such away that the stable combustion situation is always obtained in the gas turbine combustor 14. Hence, the combustor bypass valve 20 and the IGV 21 can be driven to thereby control the introduction amounts of the air into the compressor C and the combustor 14.

According to this embodiment, in the single shaft combined plant of the dual fuel type in which both the natural gas and the oil can be used as the fuel, the steam turbine output 12 can be accurately calculated even in (1) the gas combustion case and (2) the oil combustion case. Also, in the gas turbine combustor 14, stable combustion can be attained even in both of (1) the gas combustion case and (2) the oil combustion case.

According to this embodiment, the output of the steam turbine 12 or the gas turbine 13 can be calculated by an easy method, and the output of the steam turbine 12 or the gas turbine 13 can be calculated by a method that is not largely changed from the conventional method.

According to the present invention, in the single shaft combined plant of the dual fuel type, the output of the steam turbine can be calculated.

What is claimed is:

1. A turbine plant adapted to be driven by a selected one of gas fuel and oil fuel comprising:
    a steam turbine which includes a high pressure steam turbine, an intermediate pressure steam turbine, and a low pressure steam turbine;
    a gas turbine connected to said steam turbine by a rotation shaft;
    a generator connected to said steam turbine and said gas turbine by said rotation shaft; and
    an analyzing unit which includes:
        a pressure measuring unit which measures a steam pressure of an inlet side of said intermediate pressure steam turbine;
        a correction estimating unit which estimates a correction value associated with output of said low pressure steam turbine; and
        an estimating unit which estimates output of said steam turbine based on said steam pressure and said correction value.

2. The turbine plant of claim 1, where said gas turbine is connected to said steam turbine by a single said rotation shaft and said generator is connected to said steam turbine and said gas turbine by the single said rotation shaft.

3. The turbine plant according to claim 2, wherein said correction value is calculated based on a flow rate of steam flowing into said low pressure steam turbine.

4. The turbine plant according to claim 2, further comprising:
    a detecting unit which detects an opening of a regulating valve which regulates a flow rate of steam flowing into said low pressure steam turbine;
    an inlet pressure measuring unit which measures an inlet steam pressure of said regulating valve; and
    an outlet pressure measuring unit which measures an outlet steam pressure of said regulating valve,
    said correction value being calculated based on said opening and said inlet steam pressure and said outlet steam pressure.

5. The turbine plant according to claim 2, further comprising:
    a first correction unit calculating a first correction value based on a steam temperature of an inlet side of said high pressure steam turbine;
    a second correction unit calculating a second correction value based on a steam temperature of an inlet side of said intermediate pressure steam turbine; and
    a third correction unit calculating a third correction value based on a degree of vacuum in a steam condenser which receives steam from said steam turbine,
    wherein said estimating unit estimates output of said steam turbine based on said first correction value and said second correction value and said third correction value.

6. The turbine plant according to claim 2, further comprising;
    a gas turbine output estimating unit calculating gas turbine output by subtracting output of said steam turbine from total output of said turbine plant.

7. The turbine plant according to claim 2,
    wherein a flow rate of low pressure steam flowing into said low pressure steam turbine when gas fuel is supplied to said turbine plant is different from a flow rate of said low pressure steam when oil fuel is supplied to said turbine plant.

8. The turbine plant according to claim 2, further comprising:
    a preheating unit through which water passes when gas fuel is combusted and which bypasses water when oil fuel is combusted;
    a bypass valve through which said water passes so that said water bypasses said preheating unit when oil fuel is combusted;
    a deaerator which receives the water from said preheating unit when gas fuel is combusted and from said bypass valve when oil fuel is combusted; and
    a heating steam supply piping which supplies steam for heating from a low pressure piping to said low pressure steam turbine inlet to said deaerator when said deaerator receives the water.

9. A turbine plant according to claim 2,
    wherein said gas turbine includes a premix combustor.

10. A turbine plant according to claim 2, further comprising:

a gas turbine output estimating unit which calculates gas turbine output by subtracting output of said steam turbine from total output of said turbine plant; and a gas turbine air controlling unit controlling a flow rate of air introduced to said gas turbine based on said gas turbine output.

11. A turbine plant according to claim 10, further comprising:

a compressor air controlling unit controlling a flow rate of air introduced to a compressor included in said gas turbine based on said gas turbine output.

12. A turbine plant according to claim 10, further comprising:

a combustor air controlling unit controlling a flow rate of air introduced to a combustor of said gas turbine based on said gas turbine output.

13. A turbine plant according to claim 10, further comprising:

a bypass valve for controlling a flow rate of air exhausted from a compressor included in said gas turbine and flowing into a combustor included in said gas turbine.

14. A turbine plant analyzing apparatus for analyzing a turbine plant, adapted to be driven by a selected one of gas fuel and oil fuel, including, a steam turbine which includes a high pressure steam turbine, an intermediate pressure steam turbine, and a low pressure steam turbine;

a gas turbine connected to said steam turbine by a rotation shaft; and a generator connected to said steam turbine and said gas turbine by said rotation shaft;

wherein said turbine plant analyzing apparatus comprises:

a pressure measuring unit which measures a steam pressure of an inlet side of said intermediate pressure steam turbine;

a correction estimating unit which estimates a correction value associated with output of said low pressure steam turbine; and an estimating unit which estimates output of said steam turbine based on said steam pressure and said correction value.

15. The turbine plant analyzing apparatus according to claim 14, wherein said correction value is calculated based on a flow rate of steam flowing into said low pressure steam turbine.

16. The turbine plant analyzing apparatus according to claim 14, further comprising:

a detecting unit which detects an opening of a regulating valve which regulates a flow rate of steam flowing into said low pressure steam turbine;

an inlet pressure measuring unit which measures an inlet steam pressure of said regulating valve; and an outlet pressure measuring unit which measures an outlet steam pressure of said regulating valve, said correction value being calculated based on said opening and said inlet steam pressure and said outlet steam pressure.

17. The turbine plant analyzing apparatus according to claim 14, further comprising:

a first correction unit calculating a first correction value based on a steam temperature of an inlet side of said high pressure steam turbine;

a second correction unit calculating a second correction value based on a steam temperature of an inlet side of said intermediate pressure steam turbine; and a third correction unit calculating a third correction value based on a degree of vacuum in a steam condenser which receives steam from said steam turbine, wherein said estimating unit estimates output of said steam turbine based on said first correction value and said second correction value and said third correction value.

18. The turbine plant analyzing apparatus according to claim 14, further comprising:

a gas turbine output estimating unit calculating gas turbine output by subtracting output of said steam turbine from total output of said turbine plant.

19. An operation method of a turbine plant, adapted to be driven by a selected one of gas fuel and oil fuel, including;

a steam turbine;

a gas turbine connected to said steam turbine by a rotation shaft; and a generator connected to said steam turbine and said gas turbine by said rotation shaft, wherein said steam turbine comprises:

a high pressure steam turbine;

an intermediate pressure steam turbine; and a low pressure steam turbine, and wherein said method comprises:

calculating gross output of said steam turbine by using an inlet steam pressure of said intermediate pressure steam turbine;

calculating a correction value associated with output of said low pressure steam turbine;

calculating net output of said steam turbine by adding said gross output and said correction value; and controlling said gas turbine based on a difference between said net output and said total output of said turbine plant.

* * * * *